United States Patent
Larson

(10) Patent No.: US 7,212,410 B2
(45) Date of Patent: May 1, 2007

(54) ACTUATOR FOR SMALL FORM-FACTOR PLUGGABLE TRANSCEIVER

(75) Inventor: Eric Larson, Boulder, CO (US)

(73) Assignee: Finisar Corporation, Sunnyvale, CA (US)

( * ) Notice: Subject to any disclaimer, the term of this patent is extended or adjusted under 35 U.S.C. 154(b) by 315 days.

(21) Appl. No.: 10/759,890

(22) Filed: Jan. 16, 2004

(65) Prior Publication Data

US 2005/0157474 A1    Jul. 21, 2005

(51) Int. Cl.
*H05K 7/12* (2006.01)
*H01R 13/422* (2006.01)

(52) U.S. Cl. .................. 361/726; 361/747; 361/759; 361/740; 361/801; 385/53; 385/92; 439/160; 439/372

(58) Field of Classification Search ........ 361/728–732, 361/726, 741, 747, 759, 801; 385/53, 92; 439/372, 160
See application file for complete search history.

(56) References Cited

U.S. PATENT DOCUMENTS

| | | | |
|---|---|---|---|
| 6,141,660 A | 10/2000 | Bach et al. | 707/103 |
| 6,430,053 B1* | 8/2002 | Peterson et al. | 361/728 |
| 6,439,918 B1* | 8/2002 | Togami et al. | 439/372 |
| 6,494,623 B1 | 12/2002 | Ahrens et al. | |
| 6,517,382 B2 | 2/2003 | Flickinger et al. | |
| 6,533,470 B2 | 3/2003 | Ahrens | |
| 6,533,603 B1 | 3/2003 | Togami | |
| 6,570,768 B2 | 5/2003 | Medina | |
| 6,612,858 B1 | 9/2003 | Stockhaus | |
| 6,655,855 B2 | 12/2003 | Nakura et al. | |
| 6,746,158 B2* | 6/2004 | Merrick | 385/53 |
| 6,778,399 B2* | 8/2004 | Medina et al. | 361/729 |

(Continued)

FOREIGN PATENT DOCUMENTS

| | | |
|---|---|---|
| JP | 2003256455 | 3/2002 |
| WO | WO02101579 | 12/2002 |

OTHER PUBLICATIONS

*Combining RDF and XML Schemas to Enhance Interoperability Between Metadata Application Profiles*—Hunter, J. et al.; 2001 IEEE/ACM Digital Library.

(Continued)

*Primary Examiner*—Dean A. Reichard
*Assistant Examiner*—Dameon E. Levi
(74) *Attorney, Agent, or Firm*—Workman Nydegger

(57) ABSTRACT

A transceiver module has an interface surface and is received within a cage. The cage has a cage latch that retains the transceiver module. The transceiver module has a ramp, an actuator and a release handle. The ramp is located on the interface surface of the transceiver module and has a ramp surface that slopes away from the interface surface of the transceiver module and toward the cage latch. The actuator is adjacent the interface surface of the transceiver module and is configured to be movable on the ramp surface. The release handle is mounted on the transceiver module and is coupled to the actuator. Rotating the release handle in a first direction causes the actuator to move along the ramp surface toward the cage latch thereby moving the cage latch away from the interface surface. Rotating the release handle in a second direction causes the actuator to move along the ramp surface toward the interface surface and away from the cage latch.

24 Claims, 5 Drawing Sheets

U.S. PATENT DOCUMENTS

| | | | | |
|---|---|---|---|---|
| 6,786,653 B1 * | 9/2004 | Hwang et al. | ................ | 385/92 |
| 6,810,429 B1 | 10/2004 | Walsh et al. | ................ | 709/246 |
| 6,819,568 B2 * | 11/2004 | Cao | ................ | 361/728 |
| 6,830,385 B2 * | 12/2004 | Ishigami et al. | ................ | 385/92 |
| 6,840,680 B1 * | 1/2005 | Chiu et al. | ................ | 385/53 |
| 6,855,558 B1 * | 2/2005 | Hattori | ................ | 436/160 |
| 6,889,360 B1 | 5/2005 | Ho et al. | ................ | 715/513 |
| 6,901,403 B1 | 5/2005 | Bata et al. | ................ | 707/101 |
| 6,910,216 B2 | 6/2005 | Abileah et al. | ................ | 719/319 |
| 6,945,809 B2 * | 9/2005 | Ishigami et al. | ................ | 439/372 |
| 2002/0150344 A1 | 10/2002 | Chiu et al. | | |

OTHER PUBLICATIONS

*XAS: A System for Accessing Componentized, Virtual XML Documents*—Lo, M-L. et al.; 2001 IEEE/ACM Digital Library.

*Edutella: A P2P Networking Infrastructure Based on RDF*—Nejdl, W. et al.; 2002 IEEE/ACM Digital Library.

Agilent Technologies et al., "Small Form-Factor Pluggable (SFP) Transceiver MultiSource Agreement (MSA)," Cooperation Agreement for Small Form-Factor Pluggable Transceivers, pp. 1-38, (Sep. 14, 2000).

* cited by examiner

ACTUATOR FOR SMALL FORM-FACTOR PLUGGABLE TRANSCEIVER

BACKGROUND

This invention relates to a pluggable transceiver module for use in a connector system. The transceiver module has an actuator that releases the module from a cage.

Fiber optic systems are increasingly used for transmitting data signals. Typically, when data is transmitted by an optical network, it must be converted from an electrical signal to a light signal, and visa versa. In order to effectuate the conversion between electrical and optical signals, a transceiver module is often used at both ends of a fiber optic cable. Each transceiver module typically contains a laser transmitter circuit capable of converting electrical signals to optical signals, and an optical receiver capable of converting received optical signals back into electrical signals.

Typically, a transceiver module is electrically interfaced with a host device, such as a host computer, switching hub, network router, switch box, computer I/O or the like. Often, the transceiver module is the weakest link in a system, that is, it is most subject to failure and will need to be replaced. Consequently, in many applications it is desirable for the transceiver modules to be "hot-pluggable," that is, the transceiver module may be inserted into, and removed from, the host system without removing electrical power. In this way, if a signal transceiver module fails, it can more readily be removed from the host device and replaced with a new module without having to perform a soldering or similar operation.

Consequently, several pluggable transceiver module designs and standards have been introduced in which a pluggable transceiver module plugs into a receptacle which is electronically connected to a host circuit board. For example, such as standard is delineated in the Small Form-Factor Pluggable (SFP) Transceiver Multi-Source Agreement (MSA), dated Sep. 14, 2000. Such standards define a receptacle or cage that receives a transceiver module. The cage includes a cage tongue or latch. The cage latch also includes a slot. The transceiver module includes a latch boss that projects from the module and fits into the slot of the cage latch. In this way, the cage latch holds the transceiver module in the cage when the module in inserted in the cage. The transceiver module also includes an actuator configured to adjustably engage the cage latch deflecting it away from the latch boss thereby releasing the latch boss, and thus the transceiver module, from the cage.

Although various standards have been given for the configuration of the transceiver module and the cage, variations between manufacturers exist as to some of the specific dimensions and configurations. Consequently, even for a SFP transceiver module and cage that comports with the MSA standard, it is not always known how far the actuator must be moved in order to deflect the cage latch sufficiently to release the transceiver module. A configuration for releasing the transceiver module that is more consistent from manufacturer to manufacturer, regardless of the specific configurations, would be an improvement to the art.

SUMMARY

The present invention is a transceiver module for use in a data transmission system. The transceiver module has an interface surface and is received within a cage. The cage has a cage latch that retains the transceiver module. The transceiver module has a ramp, an actuator and a release handle. The ramp is located on the interface surface of the transceiver module and has a ramp surface that slopes away from the interface surface of the transceiver module and toward the cage latch. The actuator is adjacent the interface surface of the transceiver module and is configured to be movable on the ramp surface. The release handle is mounted on the transceiver module and is coupled to the actuator. Rotating the release handle in a first direction causes the actuator to move along the ramp surface toward the cage latch thereby moving the cage latch away from the interface surface. Rotating the release handle in a second direction causes the actuator to move along the ramp surface toward the interface surface and away from the cage latch.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
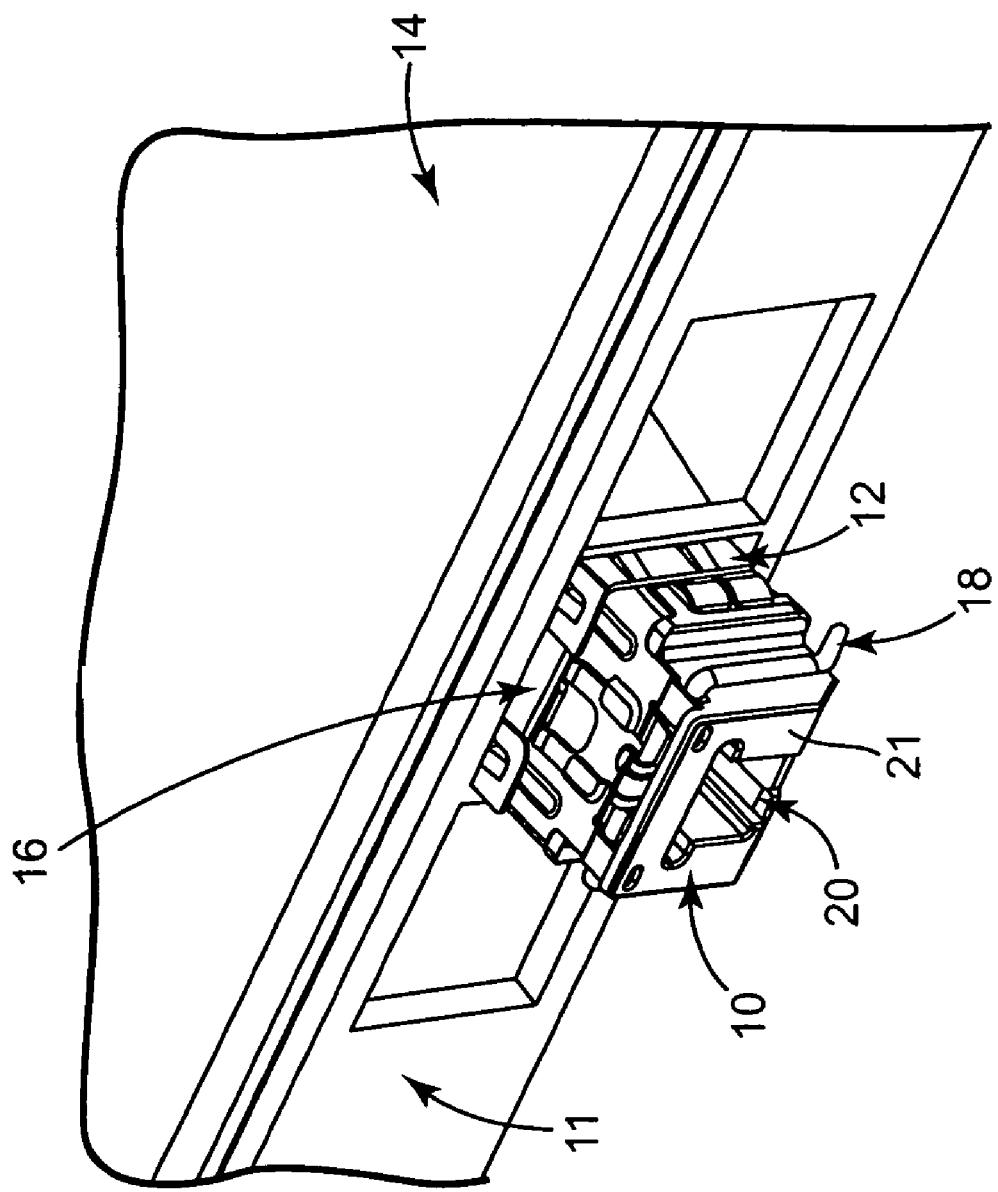
FIG. 1 illustrates a printed circuit board having a cage mounted thereon and a transceiver module plugged into the cage in accordance with the present invention.

FIG. 1 illustrates transceiver module 10, face plate 11, cage 12, and printed circuit board (PCB) 14 in accordance with the present invention. Cage 12 is shown mounted to PCB 14. Cage 12 can be secured to PCB 14 in various ways consistent with present invention. Face plate 11 is fixed the PCB 14 and typically includes a plurality of openings. Cage 12 is illustrated extending through one of the openings in face plate 11. Cage 12 may be further secured to faceplate 11 with outwardly-extending prongs or springs or the like. Only a single cage 12 is illustrated extending through faceplate 11 for ease of illustration, but one skilled in the art will recognize that a multiplicity of cages can be mounted to PCB 14 and extend through faceplate 11 to receive a multiplicity of transceivers in accordance with the present invention.

Cage 12 also includes cage latch 16. Transceiver module 10 is shown inserted into cage 12 and secured by cage latch 16. Cage latch 16 is biased so that it tends to move toward transceiver module 10 thereby securing transceiver module 10 within cage 12. Cage latch 16 is also flexible such that it can be moved away from transceiver module 10 so that transceiver module 10 can be extracted from cage 12, as will be described in more detail below.

Transceiver module 10 includes release handle 18. In order to extract transceiver module 10 from cage 12 release handle may be rotated in order to release transceiver module 10 from cage latch 16 such that transceiver module 10 may be slid out of cage 12. Transceiver module 10 includes input/output terminal 20 in its front face 21. Input/output terminal 20 may function as an optical input or optical output. In other embodiments, multiple input/output terminals 20 may be used to provide both input and output for optical and electrical signals to and from transceiver module. A single input/output terminal 20 is illustrated for ease of explanation. Front face 21 is referred to as being at the front of transceiver module 10. However, in this regard, such directional terminology is used with reference to the orientation of the figures being described and is in no way meant to be limiting. One skilled in the art will recognize that components of embodiments of the present invention can be positioned in a number of different orientations.

In operation, optical and electrical signals can be transmitted to and from a destination or source that is plugged into input/output terminal 20 to transceiver module 10. When transceiver module 10 is plugged into cage 12, it is in electrical communication with PCB 14 via the connections therebetween. Thus, signals can be sent to and from the PCB via transceiver module 10. Transceiver module 10 in hot pluggable and may be removed from cage 12 and replaced.

Figure 2:
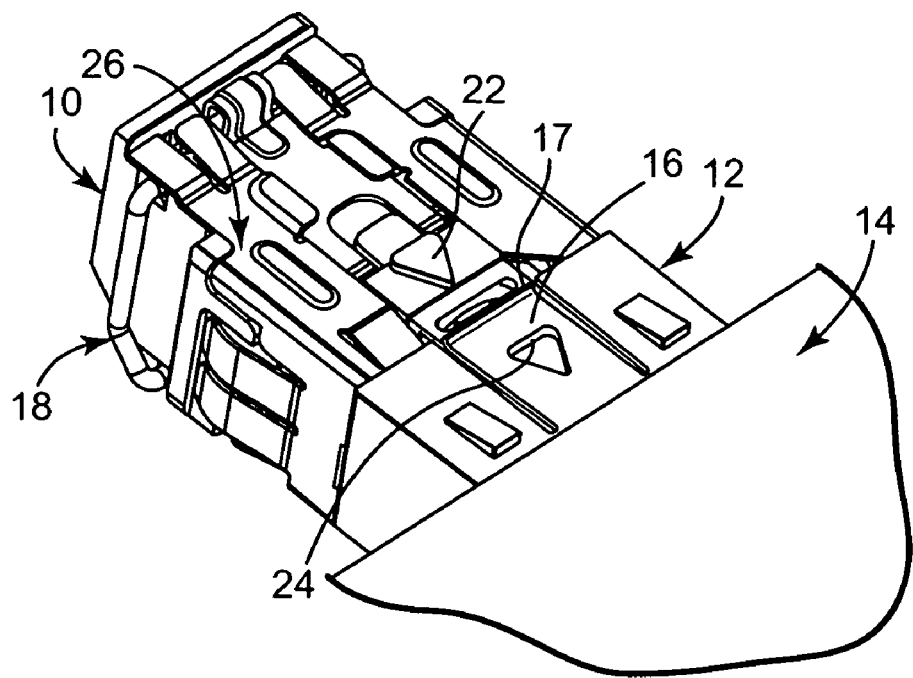
FIG. 2 illustrates the transceiver module slightly removed from the cage in the cage in accordance with the present invention.

FIG. 2 illustrates transceiver module 10 extracted slightly from cage 12 in accordance with the present invention. Cage 12 is shown mounted to PCB 14. Cage latch 16 is illustrated extending out from PCB 14. The front edge 17 of latch 16, that is, the edge closest to front face 21 of transceiver module 10, is curved slightly in a direction away from transceiver module 10, forming a sloped ramp. Cage latch 16 also includes latch slot 24. Transceiver module 10 includes module cover 26 and latch boss 22. Module cover 26 is configured to fit over transceiver module 10 and helps secure module 10 in cage 12 when it is inserted therein, and also helps secure release handle 18 to transceiver module 10.

Latch boss 22 is configured to engage cage latch 16. Specifically, when transceiver module 10 is inserted into cage 12, latch boss 22 deflects latch 16 slightly away from transceiver module 10 such that latch boss 22 travels past the front edge 17 of latch 16 and toward latch slot 24. Since front edge 17 of latch 16 is sloped away from latch boss 22, latch boss 22 more easily slides past latch 16 as module 10 slides into cage 12. When transceiver module 10 is fully inserted into cage 12, latch boss 22 is aligned with latch slot 24 such that latch boss 22 extends through latch slot 24. Latch 16 is configured with a bias such that when latch boss 22 is fully aligned with latch slot 24, latch 16 transitions back toward transceiver module 10 and rests against cage latch stop 23. In this way, transceiver module 10 will be locked into cage 12. In one embodiment of the present invention, latch boss 22 and latch slot 22 are configured to be triangular shaped and complement each other such that latch boss 22 fits through latch slot 24.

In order to remove transceiver module 10 from cage 12, latch 16 must be moved away from transceiver module 10 and off cage latch stop 23 a sufficient distance so that that latch boss 22 is removed from latch slot 24 and clears the front edge of latch slot 24, as will be described more fully below.

Figure 3:
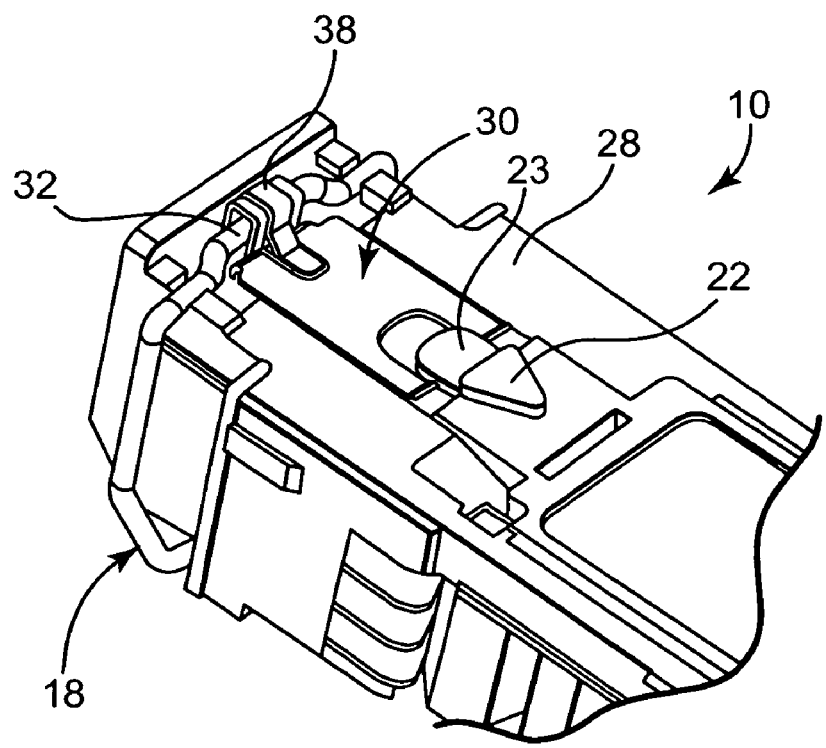
FIG. 3 illustrates the transceiver module removed from the cage.

FIG. 3 illustrates transceiver module 10 in accordance with the present invention, with module cover 26 removed to show additional detail. Transceiver module 10 has module interface surface 28. Latch boss 22 extends away from module interface surface 28 such that the top of latch boss 22 is raised relative to module interface surface 28. In one embodiment, latch boss 22 extends away from module interface surface 28 to form a triangular-shaped raised portion. Cage latch stop 23 may also be provide to help guide actuator 30 as will be described more fully below.

Also included on transceiver module 10 is actuator 30, which is situated in a slot (shown as actuator slot 40 in FIG. 5 discussed below) that is provided in module interface surface 28. Actuator 30 includes actuator arm 38. Release handle 18 is mounted in grooves or similar openings on transceiver module 10 and includes cam portion 32. Handle 18 is mounted on transceiver module 10 such that it can be rotated relative to transceiver module 10.

In FIG. 3, release handle 18 is shown in a closed or 0° position, such that it is generally parallel with the front face 21 of transceiver module 10. Cam portion 32 of release handle 18 engages actuator 30. In one embodiment, actuator arm 38 encloses cam portion 32 of release handle 18. As release handle 18 is rotated from the closed position, cam portion 32 moves away from the front of transceiver module 10 with the rotation. Since actuator arm 38 encloses cam portion 32 and actuator arm 38 is fixed to actuator 30, actuator 30 moves in an approximately linear direction away from the front face 21 of transceiver module 10 with this rotation of release handle 18.

When transceiver module 10 is plugged into cage 12, release handle 18 can be used to release transceiver module 10 from cage 12 so that it can be extracted therefrom. As release handle 18 is rotated from the closed position, actuator 30 moves approximately linearly along module surface 28 of transceiver module 10 until it engages latch 16. Latch 16 is then deflected away from module surface 28 of transceiver module 10 and away from latch boss 22. In this way, a movement of actuator 30 against latch 16 provides clearance for latch boss 22 to pass out of latch slot 24. Once adequate clearance is provided, transceiver module 10 can be removed from cage 12.

Figure 4:
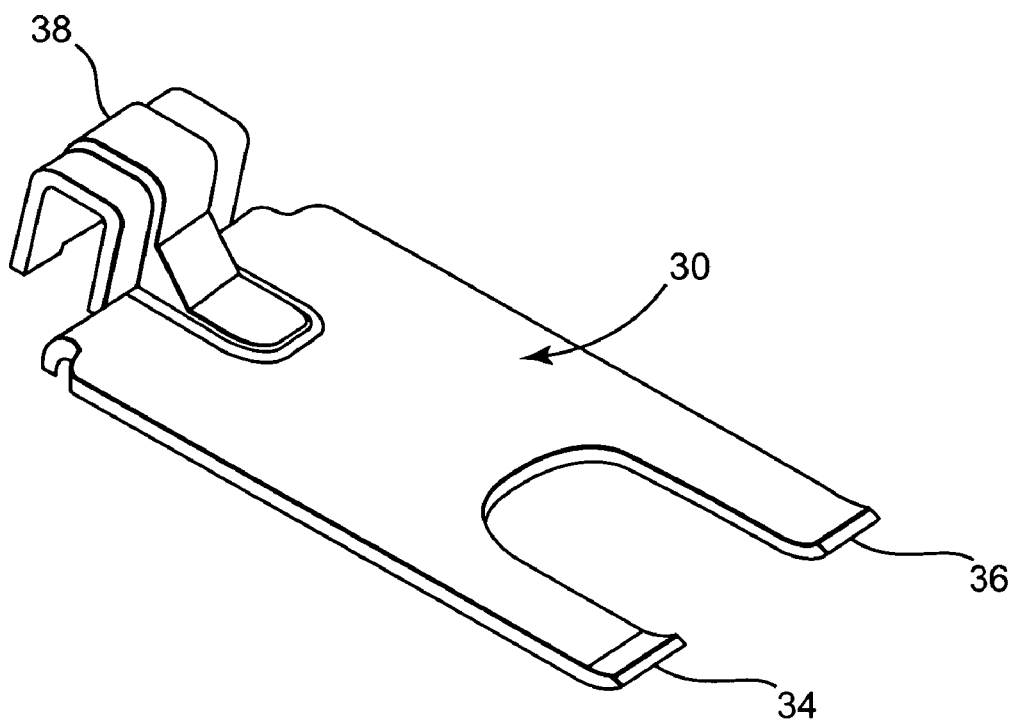
FIG. 4 illustrates an actuator from the transceiver module.
Figure 5:
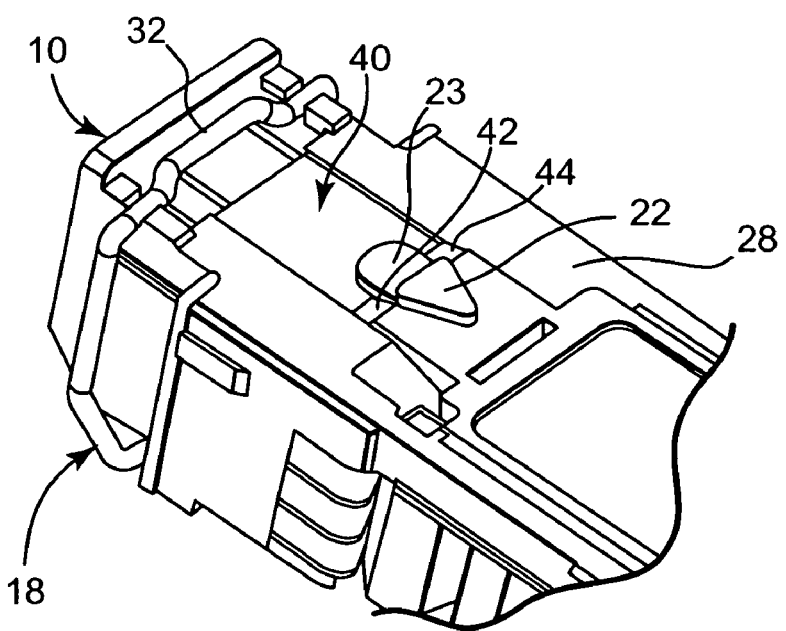
FIG. 5 illustrates the transceiver module partially disassembled.

FIG. 4 illustrates actuator 30 removed from transceiver module 10 and FIG. 5 illustrates transceiver module 10 with actuator 30 removed therefrom. In FIG. 5, module cover 26 has also been removed. Actuator 30 includes actuator arm 38 and first and second actuator tines 34 and 36. Module interface surface 28 includes actuator slot 40. Actuator slot 40 is a recessed area into which actuator 30 fits. Actuator slot 40 has a surface that is recessed relative to module interface surface 28. In one embodiment, actuator slot 40 is configured with sides to retain actuator 30 such that actuator 30 can move toward and away from the front of transceiver module 10, but so that it cannot move laterally. In addition, actuator slot may include cage latch stop 23. Cage latch stop 23 may be configured to compliment a slotted portion of actuator 30, between tines 34 and 36, thereby proving guiding to actuator 30 as it moves toward and away from front face 21 of transceiver module 10.

One end of actuator slot 40 is configured with first and second actuation ramps 42 and 44. First and second actuation ramps 42 and 44 are sloped from actuator slot 40 up to module interface surface 28. When actuator 30 is placed in actuator slot 40, first and second actuator tines 34 and 36 are configured to engage first and second actuation ramps 42 and 44. In this way, as actuator 30 moves away from the front face 21 of transceiver module 10, first and second actuator tines 34 and 36 move up first and second actuation ramps 42 and 44. Consequently, as first and second actuator tines 34 and 36 move up first and second actuation ramps 42 and 44, they move in a direction away from module surface 28. When transceiver module 10 is fully inserted in cage 12, such motion of first and second actuator tines 34 and 36 will cause them to engage latch 16 and deflect it away from module 10. Consequently, as actuator 30 moves away from the front face 21 of transceiver module 10, latch 16 will be forced in a direction away from transceiver module 10 by first and second actuator tines 34 and 36.

In order to remove transceiver module 10 from full engagement in cage 12, release handle 18 is rotated from its closed position. Such rotation will slide actuator 30 within actuator slot 40 in a direction away from the front of transceiver module 10. This will cause first and second actuator tines 34 and 36 to move up first and second actuation ramps 42 and 44 in a direction away from module surface 28 thereby engaging cage latch 16. This will cause cage latch 16 to also move in the direction away from module surface 28. This will push cage latch 16 off latch boss 22 thereby providing sufficient clearance between latch boss 22 and latch slot 24 such that transceiver module 10 can be removed from cage 12.

Actuator 30 is relatively flat and first and second actuator tines 34 and 36 are configured to extend upward from actuator 30. In one embodiment, first and second actuator tines 34 and 36 are sloped upward much like the tips of snow skis. This can help facilitate first and second actuator tines 34 and 36 moving up first and second actuation ramps 42 and 44.

Actuator 30 may also have a groove between first and second tines 34 and 36 such that when latch boss 22 is placed between first and second actuation ramps 42 and 44, as illustrated in the Figures, actuator 30 will not impeded by cage latch stop 23 or by latch boss 22 as it moves away from the front face 21 of transceiver module 10 and travels up first and second actuation ramps 42 and 44. Placing latch boss 22 immediately adjacent or between first and second actuation ramps 42 and 44 ensures that when first and second tines 34 and 36 move up first and second actuation ramps 42 and 44 they will engage release latch 16 immediately adjacent slot 24. This will provide deflection of latch 16 at the point where latch boss 22 engages slot 24 thereby providing the release of boss 22 from slot 24.

Unlike prior systems, transceiver module 10 in accordance with the present invention does not rely on a wedge-shaped actuator to deflect the cage latch. With prior wedge-shaped actuators, the shape of both the actuator and of the cage latch, of even the specific slope of its front edge, were all critical to defining how much the wedge must slide in order to deflect the latch sufficiently to release the transceiver module. Consequently, with prior systems, the amount that the wedge must slide in order to deflect the latch sufficiently to release the transceiver module varies from manufacturer to manufacturer, since manufacturers often have slightly different dimensions and shapes for their actuators and cage latches. For example, even when a cage is designed according to the MSA standards, the curvature or radius of the cage latch will vary by manufacturer. In this way, the amount of rotation of a release handle required to release the module is not readily known, and will vary for each manufacturer.

With the present invention, transceiver module 10 can be configured to precisely determine the amount that release handle 18 must be rotated in order to release transceiver module 10 from cage 12, regardless of the manufacturer that made cage 12. First and second actuator tines 34 and 36 are configured so that when release handle 18 is in the closed position tines 34 and 36 just engage first and second actuation ramps 42 and 44, but are not moving up the ramps. In this way, first and second actuator tines 34 and 36 do not extend beyond module interface surface 28. Thus, they do not engage and move cage latch 16 away from module interface surface 28 in this state. First and second actuator tines 34 and 36 are also configured, however, that when release handle 18 is rotated to a position past the closed position, tines 34 and 36 will have moved up first and second actuation ramps 42 and 44. In this way, first and second actuator tines 34 and 36 do extend beyond module interface surface 28 a sufficient amount to engage and move cage latch 16 away from module interface surface 28 and release transceiver module 10 from cage 12. Tines 34 and 36 may be specifically configured to predictably design the amount of rotation of handle 18 required to release transceiver module 10 from cage 12.

Figure 6A:
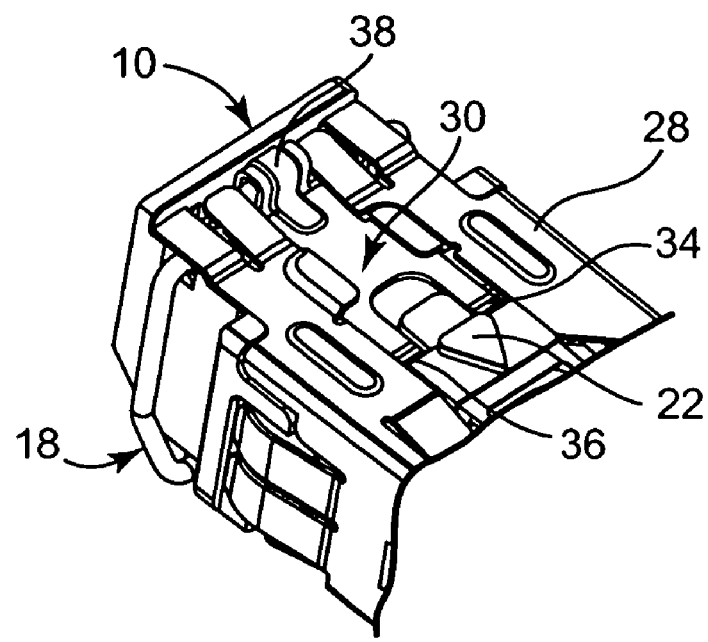
FIGS. 6A–6C illustrate various positions of a release handle of the transceiver module.
Figure 6B:
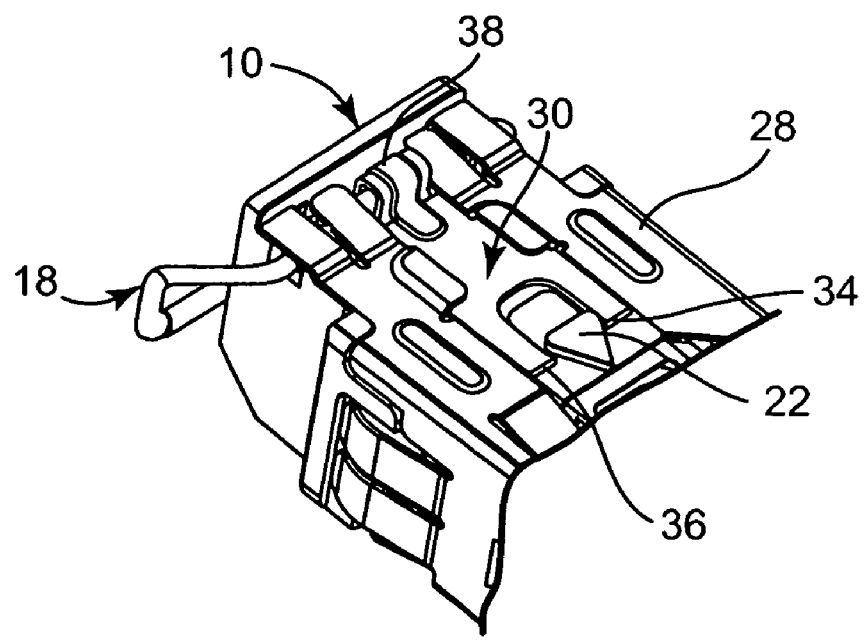
Figure 6C:
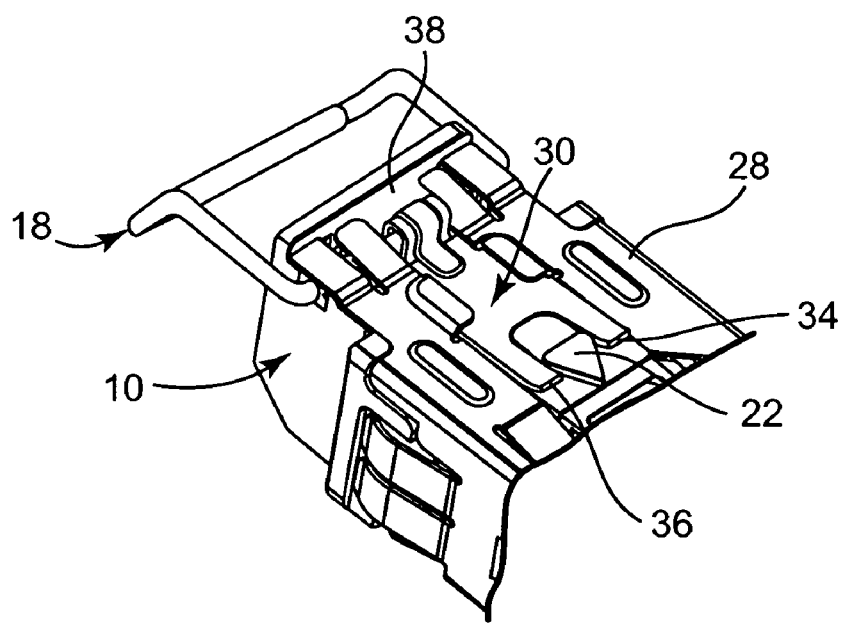

FIGS. 6A–6C illustrate various positions of release handle 18 for transceiver module 10. In FIG. 6A, release handle 18 is illustrated in the closed position. As indicated previously, in this position release handle 18 is said to be at 0°. In this position, actuator 30 is in a location toward the front face 21 of transceiver module 10. In this position, first and second actuator tines 34 and 36 have not moved up first and second actuator ramps 42 and 44. Consequently, first and second actuator tines 34 and 36 are not significantly above module surface 28. Thus, first and second actuator tines 34 and 36 do not engage latch 16 sufficiently to move it away from module surface 28. In this position, latch boss 22 is fully engaged with latch slot 24 so that transceiver module 10 cannot be removed from cage 12.

FIG. 6B illustrates release handle 18 rotated slightly from the closed position. This position is referred to as the 50° position, as release handle 18 has been rotated approximately 50° relative to its initial closed position or relative to front face 21 of transceiver module 10. In this position, cam portion 32 of release handle 18 has engaged actuator 30, by actuator arm 38 enclosure of cam portion 32, and moved actuator 30 away from the front face 21 of transceiver module 10. Thus, first and second actuator tines 34 and 36 have moved up first and second actuation ramps 42 and 44 such that they engage latch 16. In one embodiment of the present invention, when release handle 18 reaches the 50° position, first and second actuator tines 34 and 36 engage and move latch 16 sufficiently far away from module surface 28 so as to release latch boss 22 from latch slot 24. In this way, transceiver module 10 can be removed from cage 12 when release handle 18 is rotated to the 50° position. Advantageously, the release of transceiver module 10 at the 50° position can be achieved regardless of the specific shape and dimensions of cage latch 16 or of front edge 17.

FIG. 6C illustrates release handle 18 rotated 90° relative to it initial position on transceiver module 10. In one embodiment of the present invention, when release handle 18 has rotated to this 90°, first and second actuator tines 34 and 36 transition fully up first and second actuation ramps 42 and 44 such that latch 16 is deflected a maximum distance away from module surface 28. When release handle 18 reaches the 90° position, first and second actuator tines 34 and 36 move latch 16 sufficiently far away from module surface 28 so as to release latch boss 22 from latch slot 24. In this way, transceiver module 10 can be removed from cage 12 when release handle 18 is rotated to the 90° position. In one embodiment of the present invention, the release of transceiver module 10 at the 90° position can be achieved regardless of the specific shape and dimensions of cage latch 16 or front edge 17.

In each embodiment, first and second actuation ramps 42 and 44 are illustrated as having a generally linear slope, but ramps 42 and 44 can also be designed with non-linear slopes. For example, they could be designed with a curved slope such that the actuator would need travel only a short distance from the front face 21 of transceiver module to move a sufficient distance away from the module surface 28 to deflect the cage latch 16.

Although specific embodiments have been illustrated and described herein, it will be appreciated by those of ordinary skill in the art that a variety of alternate and/or equivalent implementations may be substituted for the specific embodiments shown and described without departing from the scope of the present invention. For example, a release handle has been illustrated as causing the actuator to slide up the ramp of the transceiver module, but one skilled in the art will recognize that other mechanisms can be used to slide the actuator up the ramp in order to release the transceiver module from the case. This application is intended to cover any adaptations or variations of the specific embodiments discussed herein. Therefore, it is intended that this invention be limited only by the claims and the equivalents thereof.

What is claimed is:

1. A transceiver module inserted within a cage having a cage latch that retains the transceiver module in the cage, the transceiver module comprising:
    a ramp;
    a release mechanism mounted to the transceiver module and movable between at least a first position and a second position; and
    a movable actuator coupled to the release mechanism, wherein the actuator does not deflect the cage latch when the release mechanism is in the first position, wherein the actuator moves along the ramp as the release mechanism is moved from the first position to the second position, and wherein the actuator deflects the cage latch when the release mechanism is in the second position such that the transceiver module can be removed from the cage.

2. The transceiver module of claim 1 wherein the actuator has an actuator arm to engage the release mechanism and wherein the actuator has tines configured to move along the ramp.

3. The transceiver module of claim 2 wherein the tines are shaped to slope upward from the actuator.

4. The transceiver module of claim 1 further including a projection configured to engage the latch of the cage.

5. The transceiver module of claim 4 wherein the cage latch has a slot through which the projection projects when the release mechanism is in the first position and wherein the projection is removed from the slot when the actuator deflects the cage latch when the release mechanism is in the second position.

6. The transceiver module of claim 1 wherein the release mechanism is a rotatable handle mounted to the transceiver module.

7. The transceiver module of claim 6, wherein the transceiver module has a front face and wherein the handle is in the first position when it extends parallel to the front face and wherein the handle is in the second position when it extends perpendicular to the front face.

8. The transceiver module of claim 6, wherein the transceiver module has a front face and wherein the handle is in the first position when it extends parallel to the front face and wherein the handle is in the second position when it extends at an angle 50 degrees relative to the front face.

9. A transceiver module with an interface surface received within a cage, the cage including a cage latch that retains the transceiver module, the transceiver module comprising:
    a ramp on the interface surface of the transceiver module, the ramp having a ramp surface that slopes away from the interface surface of the transceiver module and toward the cage latch;
    an actuator adjacent the interface surface of the transceiver module and configured to be movable on the ramp surface;
    a release handle mounted on the transceiver module and coupled to the actuator such that rotating the release handle in a first direction causes the actuator to move along the ramp surface toward the cage latch thereby moving the cage latch away from the interface surface and such that rotating the release handle in a second direction causes the actuator to move along the ramp surface toward the interface surface and away from the cage latch.

10. The transceiver module of claim 9 wherein the actuator has an actuator arm to engage the release handle and wherein the actuator has tines configured to move along the ramp surface.

11. The transceiver module of claim 10 wherein the tines are shaped to slope upward from the actuator.

12. The transceiver module of claim 9 further including a projection configured to project away from the interface surface and toward the cage such that the projection engages the cage latch when the actuator has not moved the cage latch away from the interface surface and such that the projection does not engage the cage latch when the actuator has moved the cage latch away from the interface surface.

13. The transceiver module of claim 12 wherein the cage latch has a slot through which the projection projects when the actuator has not moved the cage latch away from the interface surface.

14. The transceiver module of claim 12 wherein the release handle can be rotated in the first direction such that the actuator moves cage latch away from the interface surface sufficient to provide clearance between the cage latch and the projection so that the transceiver module can be removed from the cage.

15. The transceiver module of claim 9 wherein the ramp surface is linear.

16. The transceiver module of claim 9 wherein the ramp surface is curved away from the interface surface.

17. A data transmission system comprising:
    a printed circuit board;
    a cage structure fixed to the printed circuit board, the cage structure having an opening and a latch adjacent the opening, the latch further including a latch slot;
    a transceiver module pluggable into the opening of the cage structure, the transceiver module having a module projection, a ramp, a release mechanism and an actuator, wherein the transceiver module is retained within the cage by the engagement of the module projection with the latch slot and wherein the transceiver module is removable from the cage by moving the release mechanism such that it forces the actuator along the ramp such that the actuator engages the cage latch and frees the module projection from the latch slot.

18. The data transmission system of claim 17, wherein the release mechanism is a rotatable handle mounted on the transceiver module, and wherein the transceiver module has a front face.

19. The data transmission system of claim 18, wherein transceiver module is retained within the cage by the engagement of the module projection with the latch slot when he handle extends parallel to the front face.

20. The data transmission system of claim 18, wherein the transceiver module is removable from the cage as the cage latch is free of the module projection when the handle extends at an angle 50 degrees relative to the front face.

21. The transceiver module of claim 1, further comprising a body having a top surface, and wherein the ramp is disposed on the top surface of the body.

22. The transceiver module of claim 1, wherein the ramp comprises a plurality of ramps disposed on the transceiver module.

23. The transceiver module of claim 22, wherein the actuator has a plurality of tines each tine being configured to move along a separate ramp of the plurality of ramps.

24. A transceiver module, comprising:

a latch portion configured and arranged to selectively engage corresponding structure of a cage;

a handle including a cam portion; and an actuator operably disposed with respect to the cam portion so us to be movable by way of the handle such that:

when the handle is in a first position, the position of the actuator corresponds with an engagement of the corresponding structure of the cage by the latch portion; and when the handle is in a second position, the position of the actuator corresponds with a deflection of the corresponding structure of the cage that the latch portion is disengaged from the corresponding structure of the cage.

* * * * *

UNITED STATES PATENT AND TRADEMARK OFFICE
CERTIFICATE OF CORRECTION

PATENT NO. : 7,212,410 B2
APPLICATION NO. : 10/759890
DATED : May 1, 2007
INVENTOR(S) : Eric Larson Page 1 of 1

It is certified that error appears in the above-identified patent and that said Letters Patent is hereby corrected as shown below:

Column 1
Line 36, change "as" to --a--
Line 44, before "inserted" change "in" to --is--
Column 2
Line 65, after "fixed" insert --to--
Column 4
Line 3, after "slot" change "22" to --24--
Line 20, change "provide" to --provided--
Column 5
Line 46, before "impeded" insert --be--
Column 6
Line 66, change "it" to --its--
Column 9
Line 15, change "he" to --the--
Column 10
Line 9, change "us" to --as--

Signed and Sealed this

Seventeenth Day of June, 2008

JON W. DUDAS
*Director of the United States Patent and Trademark Office*